(No Model.)
D. BÖLDERL.
SKINNING KNIFE.
No. 592,217.  Patented Oct. 19, 1897.
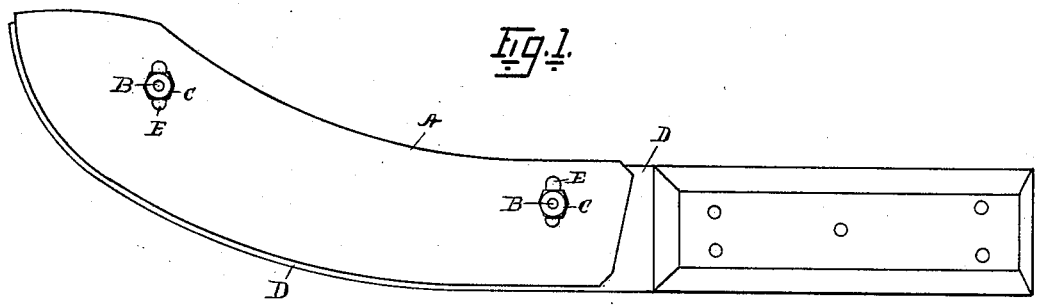
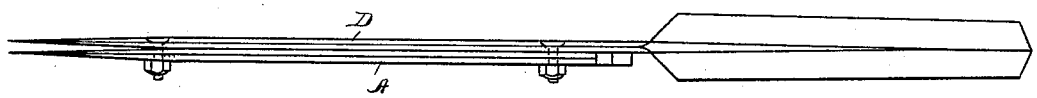
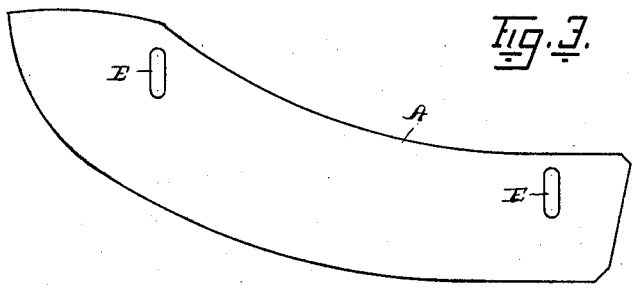
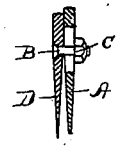
WITNESSES:
Baldwin Vale
Jno. S. Robbins.
INVENTOR
Dominick Bölderl
BY
E. F. Murdock & Co.
ATTORNEYS
THE NORRIS PETERS CO., PHOTO-LITHO., WASHINGTON, D. C.

UNITED STATES PATENT OFFICE.

DOMINICK BÖLDERL, OF SAN FRANCISCO, CALIFORNIA.

SKINNING-KNIFE.

SPECIFICATION forming part of Letters Patent No. 592,217, dated October 19, 1897.

Application filed January 18, 1897. Serial No. 619,660. (No model.)

*To all whom it may concern:*

Be it known that I, DOMINICK BÖLDERL, a citizen of the United States, residing at San Francisco, in the county of San Francisco and State of California, have invented certain new and useful Improvements in Skinning-Knives; and I do hereby declare the following to be a full, clear, and exact description of said invention, such as will enable others skilled in the art to which it most nearly appertains to make and use the same.

This invention relates to improvements in knives used for removing the skin from animals; and it consists in the novel construction and arrangement of the parts shown in the drawings, in which—

Figure 1 is a side view of a knife constructed in accordance with this invention. Fig. 2 is an edge view from the front, showing the relation of the cutting-blade to the shield. Fig. 3 is a side view of the shield as removed from the cutting-blade. Fig. 4 is a cross-section of the knife and shield.

As above stated, this invention has particular reference to knives for the purpose of removing the skin from animals. It is particularly designed to overcome the liability to accident by cutting the skin, to which the use of the ordinary knives are subject.

It is to hold the skin away from the cutting edge of the knife that I have provided the shield A. The shield is formed of metal and so shaped that the forward edge of the shield will stand away from the cutting edge of the knife when the two are clamped together. They are thus clamped by small bolts B and nuts C, which are screwed firmly down on the shield. The bolts B are provided with square flat heads which sink into recesses formed to receive them in the blade D of the knife. By this means the side of the blade next the flesh of the animal is maintained flush.

When it is desired to sharpen the blade D, the shield and its fastenings are removed, leaving the blade as free as an ordinary blade.

It is to obtain various degrees of speed in the operation of skinning that the shield is made adjustable back from the cutting edge of the blade D, it being found that the work is much more rapidly performed, as the blade D is more exposed, though it will readily be understood that the danger of accident is enlarged in proportion as the blade is exposed. The adjustment referred to is obtained by means of the elongated slots E E, through which the bolts B are extended. The adjustment is accomplished by loosening the nuts C and advancing or receding the shield.

The forward edge of the shield is rounded and dull, and is designed to bear against the skin and raise it away from the flesh of the animal or when the skin is being pulled away to take the strain of the pull and keep the skin away from the edge of the blade. It is for this purpose that it is raised. By being thus raised the blade is freed and allowed to cut the intervening tissues which bind the skin to the flesh, these being permitted to extend between the blade and shield.

In the operation of using this knife the cut is not produced by a straight forward stroke, as with a penknife, but with a sweeping or sword-like stroke. In this stroke the flesh-tissues referred to are picked up by the blade near the hilt and extended between the blade and shield until carried past the point of the knife in the downward stroke of the same. By so doing the knife is given the full play which it would have if the shield was left off and the work of skinning is proportionately faster. The flesh-tissue referred to extends in a rather indiscriminate and easily-separated mass between the flesh and the skin, and when so separated part adheres to the skin, while part adheres to the flesh. It is the latter which causes the trouble sought to be overcome by this invention. I do not prevent the blade taking hold. While this means that I sometimes scar the carcass I do not think this of the same disadvantage as retarding the work of skinning. The flesh-tissue, and sometimes the flesh, extends "between" the blade and the shield and the fact that it does so extend between overcomes the necessity of withdrawing the knife to avoid it. The utility which is subverted by the use of this construction is that of rapidity of the operation of skinning.

Having thus described this invention, I claim—

In a skinning-knife a cutting-blade, in combination with the shield, A, having a thin dull edge shaped to the cutting-blade and provided with elongated transverse slots near the back, bolts B, adapted to rest in perforations formed in the cutting-blade and to extend through the said transverse slots in the shield, said perforations so formed as to sink the heads of the said bolts flush with the surface of the blade, and nuts, C, to clamp the said shield and blade rigidly together, to raise the forward edge of the said shield away from the cutting edge of the blade, substantially as described, whereby flesh-tissues are permitted to extend between the said blade and the shield.

In testimony whereof I have hereunto set my hand this 11th day of January, 1897.

DOMINICK BÖLDERL.

Witnesses:
 E. F. MURDOCK,
 BALDWIN VALE.